United States Patent
Howard

[11] Patent Number: 5,816,594
[45] Date of Patent: Oct. 6, 1998

[54] STEERING COLUMN CENTERING ASSEMBLY

[76] Inventor: Durrell U. Howard, 306 Krameria Dr., San Antonio, Tex. 78213

[21] Appl. No.: 694,779

[22] Filed: Aug. 9, 1996

[51] Int. Cl.$^6$ .................................................. B62D 15/00
[52] U.S. Cl. ........................................... 280/90; 280/89.13
[58] Field of Search ................................... 280/89, 89.11, 280/89.12, 89.13, 90, 272; 74/498

[56] References Cited

U.S. PATENT DOCUMENTS

| | | | |
|---|---|---|---|
| 3,084,566 | 4/1963 | Pistillo | 74/495 |
| 3,171,298 | 3/1965 | Henry-Biabaud | 74/495 |
| 3,426,612 | 2/1969 | Henry-Biabaud | 74/495 |
| 3,593,592 | 7/1971 | Adams | 74/498 |
| 3,627,346 | 12/1971 | Dorner et al. | 280/90 |
| 3,654,820 | 4/1972 | Shachter | 74/495 |
| 3,888,328 | 6/1975 | Leiber | 280/89.13 |
| 4,410,193 | 10/1983 | Howard | 280/90 |
| 4,418,931 | 12/1983 | Howard | 280/89.11 |
| 4,534,577 | 8/1985 | Howard | 180/400 |
| 4,558,878 | 12/1985 | Motrenec | 280/272 |
| 4,566,712 | 1/1986 | Motrenec | 280/272 |
| 4,634,135 | 1/1987 | Nakata et al. | 280/90 |
| 4,736,962 | 4/1988 | Motrenec | 280/272 |
| 5,527,053 | 6/1996 | Howard | 280/90 |
| 5,536,028 | 7/1996 | Howard | 280/90 |

*Primary Examiner*—Kenneth R. Rice
*Attorney, Agent, or Firm*—Pollock, Vande Sande & Priddy

[57] ABSTRACT

A steering column centering assembly for resisting off-center movement of the steerable wheels of a vehicle and for returning them to a selected center position after each such movement. The centering assembly includes a screw member connected between input and output shafts of the vehicle steering column, a screw follower for engaging the screw member, a centering cylinder containing a pair of pistons, and a reciprocating member for engaging the pistons in response to movement of the screw follower. Movement of each piston in a corresponding centering chamber is resisted by a resilient force, and this resilient force causes the reciprocating member to resist axial movement of the screw follower and rotational movement of the screw member such that off-center movement of the steering column and of the steerable wheels is resisted by the centering assembly. The resistance force, the return force and the selected center position may be varied remotely.

20 Claims, 5 Drawing Sheets

STEERING COLUMN CENTERING ASSEMBLY

FIELD OF THE INVENTION

This invention relates to vehicle steering systems and more particularly to a centering device for controlling the steering column of a vehicle such as an automobile, a motor home, a bus, a truck or the like so that a center steering position is selected and maintained for the steerable wheels in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist steering inputs away from center, including those of the driver. Such positive caster is provided by positive caster offset, which is also known as mechanical trail. Caster offset is the distance from the ground intersection point of a line drawn through the pivot axis of a steerable wheel to a point at the center of the area over which the wheel contacts the ground. The pivot axis of a steerable wheel of a motor vehicle is usually provided by a "king pin". Because the contact point of a steerable wheel with positive caster trails the pivot line point of the wheel, side forces cause the wheel to turn in the direction that the force is being applied. A good example of this is the way in which the castered wheels on the front of a shopping cart are easily turned in the direction of applied force.

The adverse effects described below are some of the negative aspects of achieving steering stability through generous amounts of positive caster offset. Because of the side force applied by gravitational pull on a slanted or crowned highway, positive caster offset causes a motor vehicle to freely turn to the low side, creating a steering wheel pull that requires counteractive steering input from the driver to keep the vehicle from leaving the highway. The amount of driving fatigue that is directly caused by positive caster offset under these conditions may be appreciated by considering the many millions of miles driven by motorists each day on crowned or slanted highways.

Another fatiguing driving condition that may be encountered by a motorist is that of controlling a crosswind steering input. The amount of adverse steering input caused by crosswinds is directly related to the amount of positive caster offset, which is a classic example of having to balance a benefit with a detriment. The small amount of stability gained from castering the steerable wheels on a non-windy day may be paid for many times over when driving in a crosswind because of the destabilizing effect of the crosswind when combined with positive caster offset. Positive caster offset also allows steering inputs from rutted and other imperfect roadway surfaces to steer back against the driver and thereby cause road wander, which is a universal driving complaint, particularly by driver's of heavy vehicles such as trucks and motor homes.

Another drawback of prior art steering systems is that spurious inputs transmitted from the roadway through the steerable wheels affect substantially the entire steering assembly and the only stabilizing resistance is provided by the driver's manipulation of the steering wheel. The negative action of the steerable wheels is caused by spurious steering inputs from crosswinds, slanted or crown roads, bad road surfaces, and other adverse dynamic steering forces. Inherent geometric steering characteristics may also be responsible for spurious steering inputs. The transmission of these various inputs between the steerable wheels and the steering wheel causes steering system oscillations and vehicle wandering that require constant corrections and therefore produce driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steering column and the steerable wheels, and significantly reduces driver fatigue because it results in a major reduction in driver steering inputs. The invention also eliminates the need for positive caster offset by providing directional stability of steerable wheels with no positive caster, i.e., a caster angle of zero degrees (0°). Thus, on-center tracking of the steerable wheels is achieved by a means that does not have the deficiencies inherent in positive caster offset and that substantially reduces the need for corrective steering inputs from the vehicle driver. The positive on-center feel of such a directionally stable vehicle provides a new level of driveability for motor vehicles, including automobiles, trucks, buses, campers and motorized homes. The invention thus achieves new levels of directional stability and driveability, which reduce driver fatigue to a level that cannot be achieved by conventional positive caster centering.

The invention also allows the driver to easily make small adjustments in the centered position of the steering system to fine tune steering of the vehicle during its operation. Such fine tuning is made while driving, and makes driving more pleasurable and less fatiguing. The centering system of the invention thus comprises a steering column centering assembly having a center position that is remotely adjustable to permit the driver of the vehicle to change and reset the center position of the steering system to compensate for new or changed steering forces which would otherwise cause the vehicle to deviate from its straight ahead course.

In addition, the centering system of the invention provides remotely adjustable levels of resistance force for opposing off-center steering movements and of centering force for returning the steering system to its center position after a turning movement. The adjustment means also provides for different levels of steering force to initiate or breakaway into a steering movement away from center. This level of force is sometimes referred to in this specification as the "break away resistance". Different levels of break away resistance and of resistance force may be appropriate to compensate for different steering system characteristics on the same or different types of vehicles and/or for changes in the forces acting upon the vehicle. The level of break away resistance and of resistance force opposing movement away from center may be remotely adjusted either by a control mechanism operable by the driver or by a speed control mechanism responsive to the speed of the vehicle.

The centering force for returning the steering system to center may also be remotely adjusted either by a control mechanism operable by the driver or by a speed control mechanism responsive to the speed of the vehicle. In the present invention, the level of this return force may be the same as or may differ from the resistance force level. Both the resistance force and the return force provided by the centering system are increased or decreased to provide a level of force sufficient to overcome any spurious steering inputs and to suit driver road feel, particularly a feel of the steering wheel that lets the driver know when the steered wheels are beginning to move away from center and are closely approaching return to center.

The centering system may be left on continuously because it will automatically turn off with the ignition and come back on when the engine is started. With any malfunction of the vehicle's power steering, an automatic disabling feature of the invention shuts the system completely off.

In the absence of the centering system, spurious inputs to the steering assembly of vehicles with positive caster require almost constant manipulation of the steering wheel by the driver and make it almost impossible for the driver to hold the vehicle on a true straight ahead course. When provided on steering systems with no caster or with negative caster, the invention provides the driver with a positive touch control not heretofore attainable with those types of systems. Positive stability is thereby achieved for otherwise marginally stable or previously unstable steering systems.

The invention also provides a distinctive feel when approaching or leaving the center position. Thus, the sense of touch is added to the visual sense to aid control of the vehicle and reduce driver fatigue. The turning resistance selected should satisfy the road feel desired by the driver and be sufficient to overcome anticipated spurious inputs.

The centering system is useable with both power and non-powered steering systems, with the level of compensating forces provided usually being less for vehicles without power steering. However, use of the centering system with power steering systems is preferred because the size and weight of the centering assembly components may be less since the resistance and return forces applied to the steering column are magnified by the power steering system before being applied to the steerable wheels.

Although the present invention is particularly useful as a centering system for motor vehicles, it can be employed to position any steerable member moveable to either side of a preselected position by a steering wheel connected to the steerable member by a steering column. For example, the centering system can keep an outboard motor centered so that a boat follows a straight course over the water in the presence of spurious steering forces produced by wind and wave action. The centering system can also be used to center such steerable members as the rudders of ships or airplanes.

The steering column centering assembly of the present invention comprises a piston and cylinder unit mounted intermediate to the respective ends of a vehicle steering column. The centering assembly comprises two centering chambers, both preferably in a single centering cylinder or shell and each containing an independently movable piston. Between the two pistons is an actuator component comprising a screw member connected between input and output shafts of the vehicle steering column. Surrounding and engaging the screw member is a screw follower member. The screw and follower may be of conventional design, such as a ball screw and nut assembly or an ACME type screw and nut assembly. For example, a ball screw may be used with one or more ball nuts of conventional design. The screw follower is fixed to a splined inner guide, the respective ends of which are adapted to engage a corresponding one of the pistons. A splined outer guide is fixed to the cylinder shell and engages the splines of the inner guide to prevent the screw follower from rotating with rotation of the screw, which is rotatable by the steering column as acted upon by the steering wheel of the vehicle.

A steering column input shaft passes through one end cap of the centering cylinder and a corresponding one of the pistons, and the steering column output shaft passes through the other end cap of the centering cylinder and through the other piston. Each piston is adapted to reciprocate in its corresponding centering chamber, which is located between a corresponding end of the splined outer guide and the corresponding end cap. By reason of this arrangement, the outer guide serves as a stop defining the rest (on-center) positions of the pistons, and one piston controls vehicle turning movement in one direction and the other piston controls vehicle turning movement in the other direction. Compressive (away-from-center) movement of each piston is resisted by the resilient force of a resilient means, such as fluid pressure or a coil spring.

A pressurized fluid may be maintained in the respective piston chambers by a fluid system connected to each chamber through a corresponding port. The fluid pressure in the respective chambers provides a base level of resistance force for constantly resisting steering column movement away from center in response to spurious steering inputs, as well as a steering force applied to the steering wheel. The fluid pressure or other resilient force also provides a return force for returning the pistons and the steering column to their center or neutral positions upon cessation of the steering force.

The fluid system may include pressure control means for providing a selected pressure in each of the piston chambers, and rotation of the steering column away from its center position is opposed by this pressure acting through a corresponding one of the pistons, depending on the direction of steering wheel rotation. The acted upon piston therefore applies a resilient force to the threads of the screw member via the splined inner guide and the screw follower fixed thereto.

A particularly important feature of the invention is the provision of a remotely operable trimming assembly for controllably varying the center or other preselected position of the steering column as maintained by the centering assembly. The remote trimming assembly preferably comprises a flange fixed to the centering cylinder, which is arranged to be rotated by a pivotal connection between the flange and a trim screw of a motor actuated trim unit. Rotation of the centering cylinder by the trim unit causes the splined outer guide to rotate the splined inner guide, which in turn rotates the screw follower relative to the screw member, such that the engagement between the follower and the screw changes the center position of the steering column, as well as the center positions of the steering wheel and the steerable wheels connected to the steering column.

The fluid provided to the centering chambers may be either a gas or a liquid, and the pressure of this fluid may be varied remotely to change both the resistance force opposing movement of the steering column away from a center position, and the return force provided for returning the steering column to its center position upon release of the steering wheel. Where the fluid system utilizes a liquid, the pressure control means may include a pressure accumulator for storing fluid energy and a differential pressure valve requiring a chamber pressure higher than accumulator pressure for steering column movement away from center. The stored fluid energy also provides the return force for returning the pistons to their rest or inactive positions upon cessation of a steering force.

Use of a differential pressure valve establishes an additional level of resistance to compressive movement of the pistons such that turning of the steering wheel requires a steering force sufficient to overcome the total resistance to fluid flow represented by the accumulator pressure and the differential pressure in combination. An orifice may be placed in series with the differential pressure valve to limit the rate of piston movement away from center by further increasing the level of fluid resistance as the rate of flow through the valve increases after breakaway from the center position.

Free return flow from the accumulator to the pressure chambers upon cessation of a steering force may be provided by a line containing a check valve in parallel with the differential pressure valve and orifice. This parallel line may also contain an orifice for controlling the rate at which the steering column may be returned to its center position.

Other embodiments of the invention comprise other means of causing the pistons to apply a resilient force to the screw follower, and thereby to the screw threads. For example, the two centering chambers for housing piston movement may be combined with a single vacuum chamber between the two pistons and the necessary vacuum may be provided by the vacuum available from the manifold of a combustion engine. In this embodiment, the respective centering chambers on the outer side of each piston is vented to ambient pressure. As another alternative, the respective centering chambers may each contain a relatively heavy coil spring on the outer side of each piston for resiliently forcing the pistons against the corresponding ends of the splined inner guide.

The preferred embodiments of the invention may include the following features: resistance force for opposing steering movement away from center and return force for return to center each of sufficient magnitude to overcome spurious steering inputs, remotely variable levels of resistance force and return force through a predetermined range of turning movement, remotely trimmable center position, no substantial overshoot, free return to center position, fail-safe mode for disabling the centering assembly in the absence of power steering, precision centering, dampening of erratic steering movements, compact size, economical to manufacture and install, utility for old and new vehicles with or without power steering, and distinctive driver road feel.

BRIEF DESCRIPTION OF THE DRAWINGS

The invention, both as to its structure and operation, may be further understood by reference to the detailed description below taken in conjunction with the accompanying drawings in which.

DETAILED DESCRIPTION OF THE INVENTION

Figure 1:
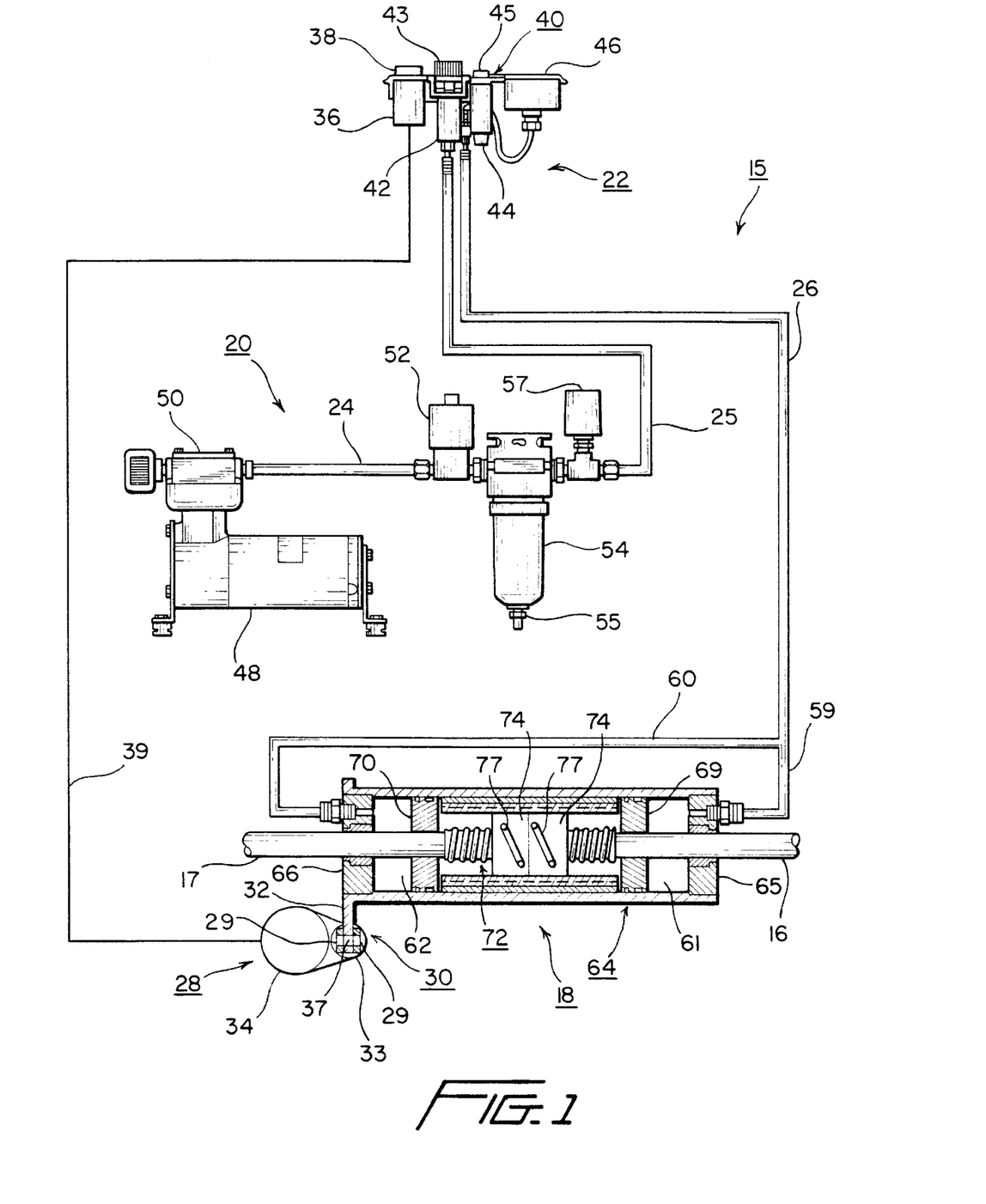
FIG. 1 is a schematic diagram of the fluid and electrical systems and of the major components of the invention, and includes a side elevational view in section showing structural details of the centering assembly and the trim assembly.

The steering column centering system of the present invention comprises a centering assembly, generally designated 15, which is connected between an input shaft 16 and an output shaft 17 of the steering column of a motor vehicle as shown in FIG. 1 of the drawings. The centering system comprises a centering assembly 18, to which pressurized air is supplied from an air supply assembly 20 via a control assembly 22, these assemblies being interconnected by appropriately sized air lines 24, 25 and 26.

The centering system 15 also includes a trim assembly 28 connected to the centering assembly 18 by a pivot connection 30 and a trim flange 32. Pivot connection 30 comprises a pair of apertured ears 29, 29 projecting axially from the distal end of a trim screw 33, and an aperture 37 in trim flange 32. A bolt secured by a nut (not shown) passes through the apertures to pivotally connect the flange 32 to the trim screw ears 29, 29.

The trim assembly 28 also includes a reversible electric motor 34 connected to a trim switch 36 by an electrical line 39. The trim switch 36 includes a trim button 38 on a control panel 40, which preferably is located at or near the driver's station of the vehicle. The trim button 38 actuates an electrical switch of a toggle design that is spring-biased to a circuit-open position. Such switches are closed only momentarily when the toggle is held in a depressed position against the spring bias. Thus, the trim adjusting motor 34 is actuated only while the toggle is depressed by the button 38. Release of the button 38 opens a circuit and stops the trim adjustment at the point selected. Trim button 38 has two actuating positions, one for trimming the steering wheel to the right (clockwise) and the other for trimming the steering wheel to the left (counterclockwise).

Also mounted on the control panel 40 is an air pressure regulator 42 having a manual adjustment knob 43, an on/off power switch 44 having a push button 45, and an air pressure gauge 46.

Pressurized air is supplied to the air pressure regulator 42 by the air supply assembly 20, which comprises an air compressor 48, an intake and discharge manifold 50, a solenoid actuated dump valve 52 for depressurizing the air supply assembly, an air filter and dryer unit 54 having a moisture drain valve 55, and an adjustable pressure actuated cut-off switch 57 for cutting the air compressor on and off depending the desired output pressure. Air pressure above that desired for operating the centering assembly is supplied from supply assembly 20 to regulator 42 by the air line 25, and then the desired regulated air pressure is supplied to the centering assembly 18 via the regulated air supply line 26 which supplies two branch air lines 59 and 60. Branch line 59 supplies pressurized air to a first pressure chamber 61, and branch line 60 supplies pressurized air to a second pressure chamber 62 of a centering cylinder 64 having a first end cap 65 and a second end cap 66.

Figure 2:
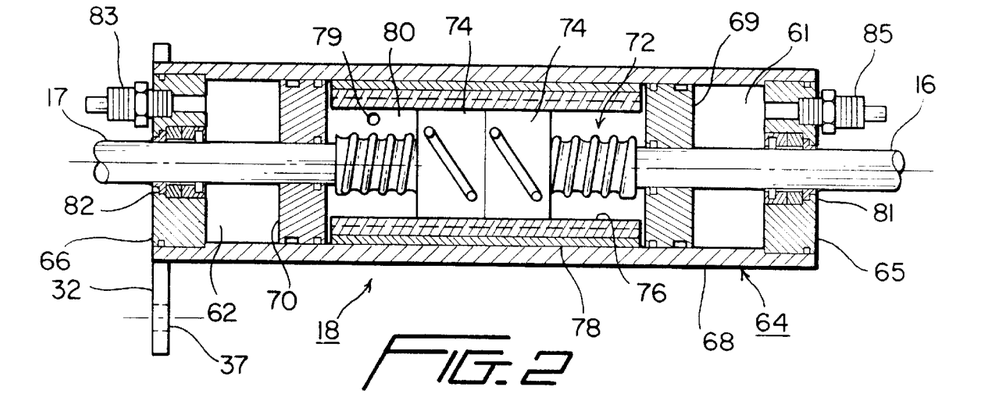
FIG. 2 is an enlarged sectional view of the centering assembly portion of FIG. 1.
Figure 3:
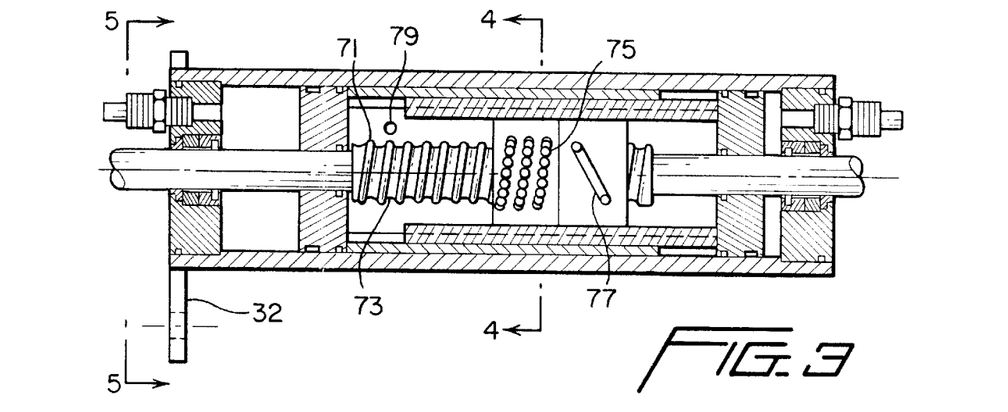
FIG. 3 is the same sectional view as FIG. 2, except the steering column has been turned away from its center position so that one of the pistons and the related components are shown in their biasing positions for causing a return to center.
Figure 4:
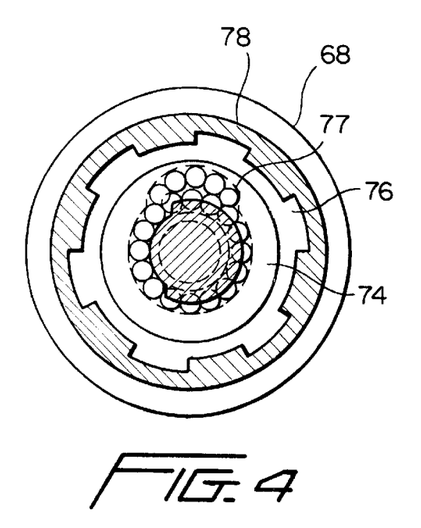
FIG. 4 is a transverse sectional view taken along lines 4—4 of FIG. 3.

Referring now to FIGS. 2 and 3, the centering cylinder 64 comprises a cylindrical housing 68 which, together with the end caps 65 and 66, encloses the two separate interior pressure chambers 61 and 62, chamber 61 containing a centering piston 69 and chamber 62 containing a centering piston 70. Rigidly secured between the proximate ends of steering column input shaft 16 and output shaft 17 is a ball screw engaged by one or more ball nuts, such as a pair of ball nuts 74, 74. The ball nuts are rigidly fixed to a splined inner guide 76, the splines of which are intermeshed with the splines of an outer guide 78 as shown in FIG. 4. Outer guide 78 is rigidly fixed to the inside wall of cylindrical housing 68.

The respective input and output shafts 16 and 17 of the steering column rotate with the steering wheel, and therefore the shaft 16 is journaled for rotation in a aperture 81 in end cap 65, and shaft 17 is journaled for rotation in an aperture 82 of end cap 66. The apertures 81 and 82 contain appropriate packing and/or bearings permitting such rotation, and also contain appropriate seals for maintaining pressurized air within the pressure chambers 61 and 62.

The way in which the components of the centering assembly center and stabilize a vehicle steering system will now be described with reference to FIG. 3. The steering column input and output shafts 16 and 17 are journaled by appropriate seals, and by appropriate packing and/or bearings, for both rotational and sliding movements relative to the pistons 69 and 70, respectively. Since the intermeshing of the splines of the inner guide 76 and outer guide 78 prevent rotation of the ball nuts 74, 74, rotation of the ball screw 72 in response to turning of the steering column by the steering wheel causes the ball nuts 74, 74 to advance axially along the ball screw, depending on the direction of rotation of the steering wheel.

The effect of such rotation of the ball screw is shown in FIG. 3 where rotation of the steering wheel counterclockwise for a left turn has caused the inner guide 76 to move toward the right side of the figure along with the ball nuts to which it is rigidly fixed. This causes the inner guide 76 to drive piston 69 toward the right against the action of the air pressure in chamber 61. In other words, since rotation of the ball nuts is prevented by the intermeshing of the splines of the inner and outer guides, rotation of the ball screw causes the ball nuts to advance along the axis of the ball screw. The air pressure in chamber 61 thereby resiliently opposes such rotary motion of the steering wheel away from the selected center position by reason of the interaction between balls 75 of the ball nuts and the spiral thread 71 of the ball screw. So that pistons 69 and 70 will move freely in response to rotation of screw 72, a vent hole 79 is provided for venting to ambient pressure the internal chamber 80 between pistons 69 and 70. During rotation of the screw 72, the balls 75 travel continuously around the races of the ball nuts and in corresponding portions of the spiral ball screw groove 73. The race of each ball nut is also in the form of a spiral and the balls traveling in this spiral race are returned from the end of this race to the beginning of this race via an external return race 77, which is the usual structure of ball screw and nut assemblies. One such assembly is available as a Rockford Ball Screw Assembly from Rand Industries, Inc., of Rockford, Ill.

Thus, movement of the ball nuts 74, 74 from the position shown in FIG. 2 to the position shown in FIG. 3 is resisted by the pressure in chamber 61 such that a resistance force opposes off-center movement of the steering wheel. Similarly, while the ball nuts are moved away from their neutral or rest position as shown in FIG. 3, the pressure in chamber 61 applies a return force the ball screw 72 by creating a resilient bias on piston 69 and the ball nuts tending to return them from the positions shown in FIG. 3 to the positions shown in FIG. 2. This return force will cause the steering wheel to return to its center position when released by the driver.

Pistons 69 and 70 are both arranged for compressive movement toward the opposite ends of their respective centering chambers, piston 69 traveling in chamber 61 and piston 70 traveling in chamber 62 within the cylinder 64. The retracted position of each piston is defined by the outer guide 78, which serves as a piston stop and preferably has an axial length substantially (preferably within one-ten thousandth of an inch) equal to the axial length of inner guide 76. An outer guide length greater than the inner guide length is undesirable because gaps between opposing surfaces would allow unbiased movement (slack) between the inner guide and the respective pistons. An outer guide length less than the inner guide length is also undesirable because this would let fluid flow back and forth between chambers 61 and 62 through the connecting conduit 59 and 60 so that the pistons 69 and 70 would move (drift) together until one of them bottoms out against the outer guide, there being no pressure differential applied to the inner guide during such joint piston movement. Accordingly, the pressurization system constantly biases the centering pistons into substantially simultaneous engagement with both the inner and outer guides at all times when the centering assembly is activated and in its selected center position so that there is no significant slack or drift at any time during its operation.

A particularly important feature of the invention is the provision of means to remotely "trim" the center position of the steering column, and thereby the center of the steerable front wheels of the vehicle, in order to compensate for changes in extraneous steering forces that would otherwise cause the vehicle to drift off of its straight ahead course unless opposed by driver manipulation of the steering wheel. Trimming is accomplished by rotating the cylindrical shell 68 of the centering cylinder 64 as illustrated in FIGS. 6–9. As previously indicated and shown best in FIG. 6, the trimming assembly 28 includes a trim flange 32 projecting laterally from and affixed to the shell 68 of centering cylinder 64. The distal end of flange 32 is connected by the pivot connection 30 to the threaded trim screw 33, which may be of the ball or ACME type. Screw 33 is extended and retracted in the direction of the double ended arrow E by a screw driving mechanism in a housing 35, which contains rotating balls or gears driven by the motor 34 through a gear box 31. The trim unit 28 is mounted on an appropriate frame member F of the vehicle for pivotal movement in the plane of the flange 32 by a second pivot connection 41.

Figure 6:
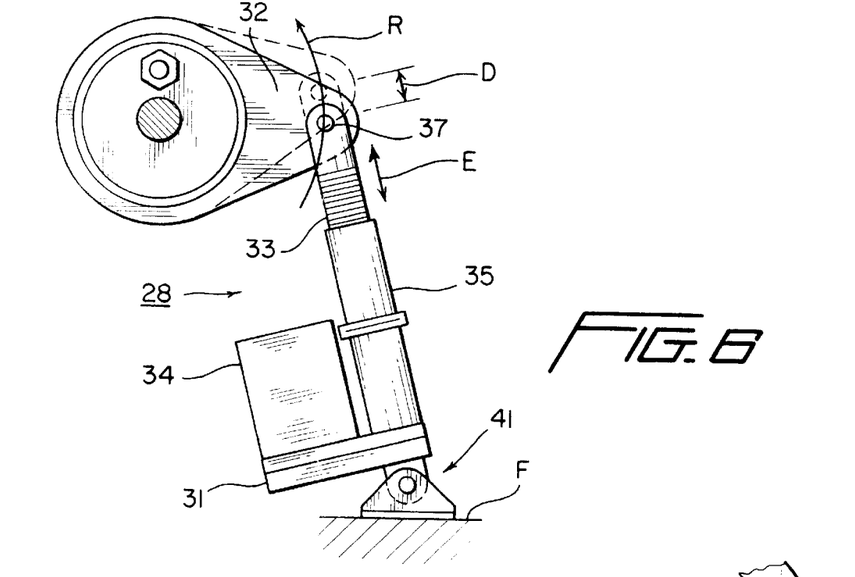
FIG. 6 is an elevational end view showing the trim assembly connected to the centering assembly by means of a projecting flange shown in the end view of FIG. 5.
Figure 7:
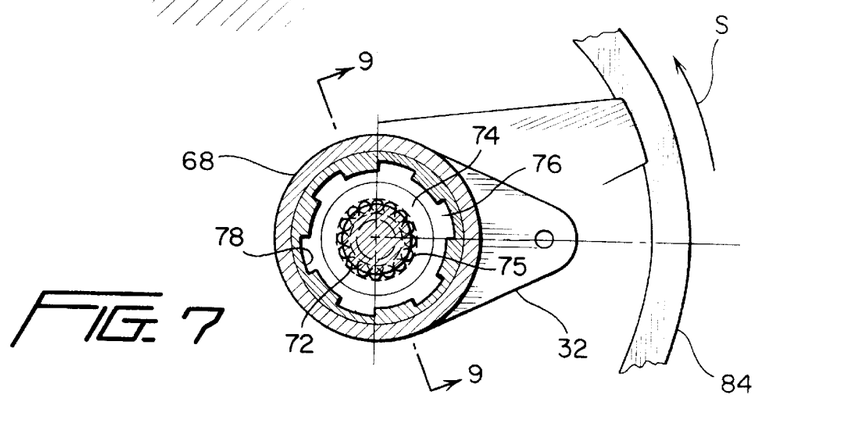
FIG. 7 is a fragmentary sectional view showing a transverse cross section of the centering assembly similar to FIG. 4, and also showing a portion of the steering wheel connected to the steering column input shaft of the steering assembly.
Figure 8:
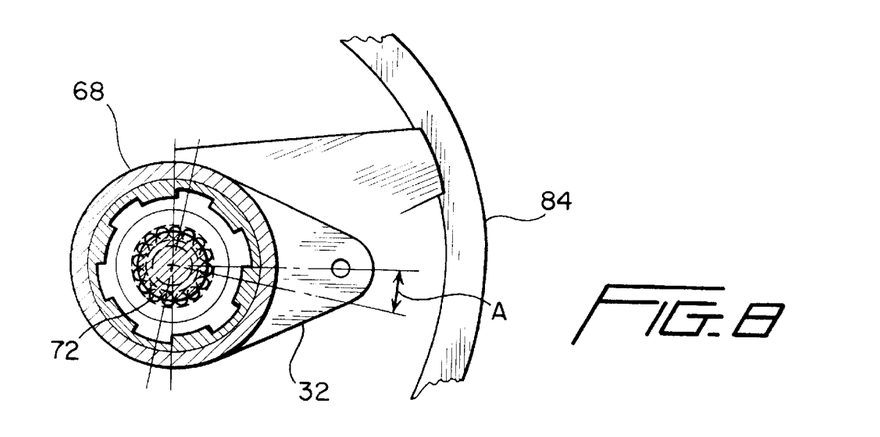
FIG. 8 is a fragmentary cross-sectional view similar to FIG. 7, but with both the centering assembly and the steering wheel in a moved position caused by actuation of the trim assembly of FIG. 6.
Figure 9:
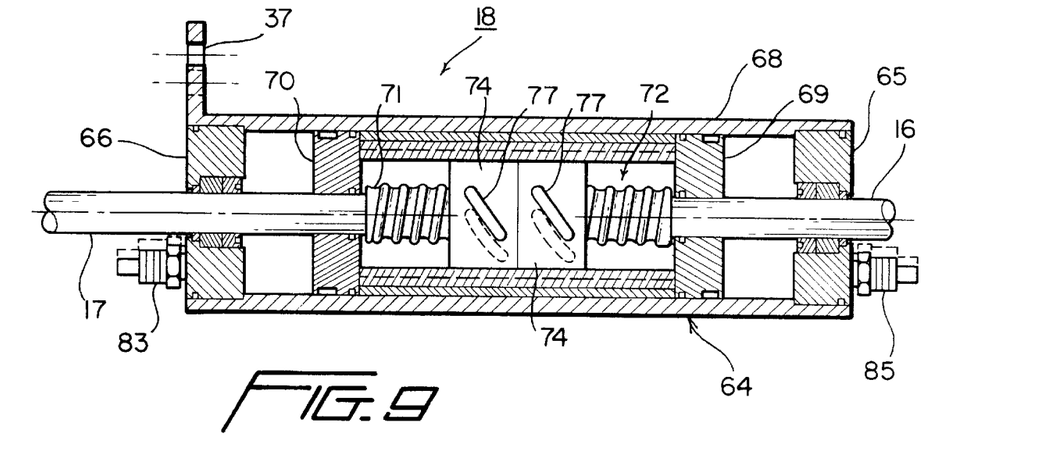
FIG. 9 is a side elevational view in section taken along lines 9—9 of the FIG. 7 and illustrating in broken lines the moved position of FIG. 8.

One example of a trimming movement for changing the center or other selected rest position of the steering column is illustrated diagrammatically in FIGS. 7–9. In this example, the trim screw 33 is extended relative its housing 35 so as to rotate trim flange 32 in the direction of arrow R in FIG. 6. This will cause a corresponding rotation of the steering wheel 84 in the direction of arrow S shown in FIG. 7. As the screw 33 moves through an axial distance D (FIG. 6), the ball screw 72, and the steering wheel 84 attached thereto through the steering column input shaft 16, rotate through a corresponding angle A (FIG. 8) as the center position of the steering wheel 84 is trimmed from the position shown in FIG. 7 to the position shown in FIG. 8.

The effect of such rotational movement of the centering cylinder 64 is also illustrated in FIG. 9 wherein broken lines are used to indicate the moved positions of various components in response to actuation of the trim assembly 28 as shown in the example of FIG. 6. Thus, counterclockwise rotation of the cylinder 64 as viewed from the steering wheel causes the air line fittings 83 and 85 to move from their solid line positions to their broken line positions, the pivot connection aperture 37 in flange 32 to move from its solid line position to its broken line position, and the ball return races 77, 77 of the ball nuts 74, 74 to move from their solid line positions to their broken line positions, all as illustrated in FIG. 9. In addition, the ball screw 72 rotates in the same direction as the return races 77, 77, which is illustrated by the advancement of the spiral thread 71 from its solid line position to its broken line position as shown for clarity only at the output end of the ball screw 72.

Figure 5:
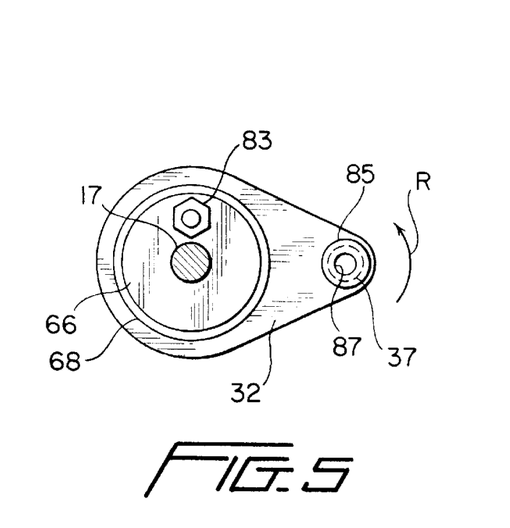
FIG. 5 is a sectional end view taken along lines 5—5 of FIG. 3.

The wall of aperture 37 in flange 32 may be in direct contact with the bolt (not shown) that pivotally connects flange 32 to trim screw ears 29, 29. Optionally, a resilient grommet 85 having a bolt receiving aperture 87 may be placed in aperture 37 as shown in FIG. 5 to provide a layer of resilient material, such as rubber, between the metal bolt and the metal wall of aperture 37. This resilient layer permits small radius turns away from and back to center that may be executed without actuating the pistons of the centering assembly, the amount of such a turn depending on the thickness and resiliency of the layer relative to the air pressure in chambers 61 and 62. In other words, the cylinder 68 and the screw 72 may rotate together through a small angle to avoid moving piston 69 or 70. Such small radius turns may be used at highway speeds to change lanes or to avoid objects in the roadway.

The resilient grommet 85, in combination with the other components of the trim assembly 28, provides a means for connecting the centering cylinder 64 to the frame F that comprises a resilient member permitting the cylinder to rotate with the screw member through a limited angle, the value of which will correspond to the amount that this resilient member may be deformed by a steering force applied to the input shaft 16 by the steering wheel 84.

The remotely controlled trim assembly 28 operates as follows. If there is a roadway pull to the right, straight ahead travel will require a compensating steering force to the left from the steering column output shaft 17 to provide straight ahead travel of the vehicle. This compensating force may be provided by a "power trim" in which the trim button 38 is pushed momentarily to its left trim position to briefly operate the reversible motor 34 in its left trimming mode until the roadway pull to the right is eliminated. The steering wheel 84, as well as the steerable wheels, will then be in a new "trimmed" position. Alternatively, while holding the steering wheel 84 to the left in a position giving straight ahead travel, the trim button 38 is pushed momentarily to its left trim position to briefly operate the reversible motor 34 in its left trimming mode until the steering wheel 84 will remain in the new "trimmed" position when released by the driver.

After its momentary actuation, the trim button 38 is released to stop the motor 34 and thereby lock the centering cylinder 64 in its new "trimmed" position corresponding to a new on-center position in which ball screw 72 has been caused to rotate into a new center position, which corresponds to the changed position of the ball nuts 74, 74 caused by trimming rotation of cylinder 64. This new on-center position of screw 72 will then maintain the vehicle steering system in a newly centered condition, which provides straight ahead travel of the vehicle that is free from the previously experienced roadway pull to the right and will be maintained even when the steering wheel is released.

Figure 10:
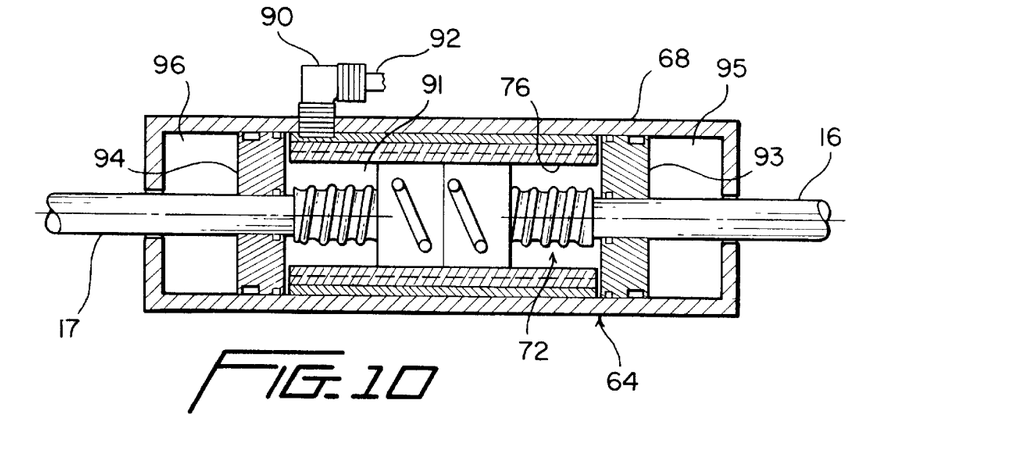
FIG. 10 is a side elevational view in section similar to FIG. 9, but showing a modification of the centering assembly.
Figure 11:
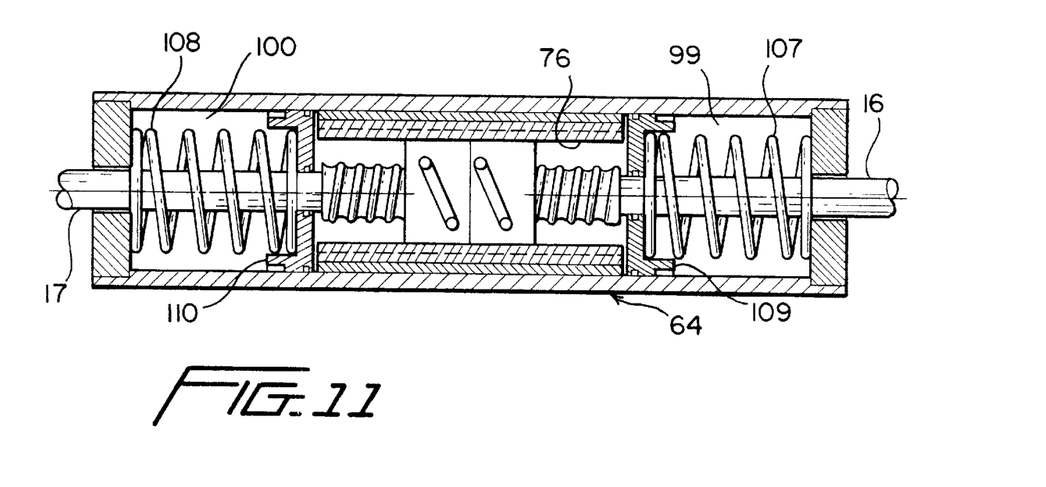
FIG. 11 is a side elevational view in section similar to FIG. 10, but illustrating a further modification of the invention; and, FIG. 12 is a schematic diagram of a modification of the fluid and electrical systems for operating the centering assembly and trim assembly of the invention.

In FIGS. 10 and 11 there are illustrated two different modifications of the invention, each utilizing a different resilient means for causing the opposing pistons to exert the respective resistance and return forces on the ball screw 72. In the embodiment of FIG. 10, a vacuum connection 90 is provided for connecting an intermediate chamber 91 to a vacuum line 92, which leads to a vacuum source, such as the manifold of an internal combustion engine. A vacuum is thereby provided in the chamber 91 during vehicle operation, and this vacuum creates a suction tending to hold the pistons 93 and 94 against the inner guide 76, such that these pistons provide a resistance force resisting movement of the ball screw 72 away from its center position, and a return force biasing the ball screw 72 back toward its center position upon rotation of the steering wheel away from the center position. In this embodiment, the respective end chambers 95 and 96 are vented to ambient pressure around the respective input and output shafts 16 and 18 to prevent any pressure build up in these chambers that could otherwise interfere with the desired movement of pistons 93 and 94.

In the modification of FIG. 11, the respective end chambers 99 and 100 contain coil springs 107 and 108 for engaging respective pistons 109 and 110 such that these pistons are biased against the inner guide 76 so as to oppose its movement away from center and thereby provide the resistance and return forces for operation of the invention in the manner previously described. In this embodiment, the respective end chambers 99 and 100 are also vented to ambient pressure around the respective input and output shafts 16 and 18 to prevent any pressure build up in these chambers that could otherwise interfere with the desired movement of pistons 109 and 110.

Figure 12:
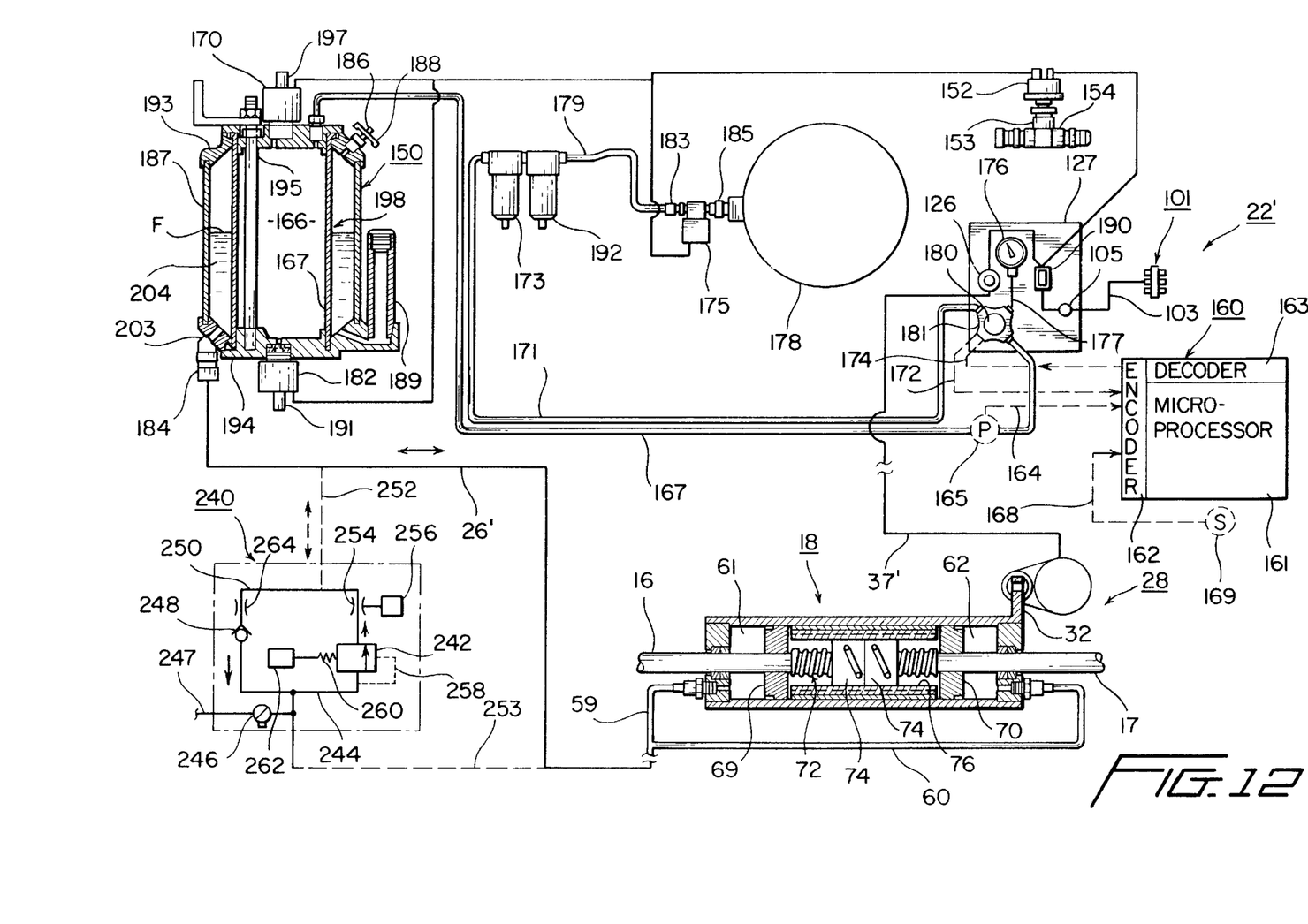

A further modification of the invention is illustrated in FIG. 12 wherein an accumulator 150 is used to provide a pressurized liquid to the pressure chambers 61 and 62 of the centering assembly 18. The accumulator 150 has an annular liquid chamber 204, a central gas chamber 166 separated from the liquid chamber by a flexible bladder 167, and solenoid operated upper and lower gas dump valves 170 and 182. A liquid trimming fluid may be desirable in some applications because it is substantially incompressible as compared to a gaseous trimming fluid and therefore provides the capability of providing greater resistance to turning movements of the steering wheel.

Bladder 167 is preferably made of neoprene. Accumulator 150 also includes an upper head 193 and a lower head 194 spaced apart by an outer housing wall 187 and secured together by peripherally spaced bolts 195, only one of which is shown in FIG. 12. Gas chamber 166 is connected to a compressed gas source 178 via a conduit 167, a pressure regulator 181, a conduit 171, a dryer 173, a particle filter 192, a conduit 179, a check valve 183, a solenoid operated cut-off valve 175, and a restrictor orifice 185 for limiting the flow rate to regulator 181.

The gas pressure in chamber 166 is indicated by a pressure gauge 176 which is connected to pressure regulator 181 by a conduit 177. The gas is preferably air, and both the bladder 167 and the surrounding housing wall 187 of accumulator 150 are preferably cylindrical. The gas pressure source 178 may be a pressurized air source, such as an onboard compressor, a vehicle airbrake system or some other conventional air pressure source, and gas pressure is regulated by a control knob 180 on the driver control panel 127.

Gas chamber 166 should be large enough for liquid chamber 204 to receive the entire volume of liquid from either chamber 61 or chamber 62 without unduly collapsing bladder 167. A bleed passage 186 containing a normally closed vent cock 188 allows liquid chamber 204 to be partially filled with hydraulic fluid up to the level of the top of a filler neck 189.

Gas pressure in chamber 166 acts through bladder 167 to store fluid energy received from the hydraulic side of the system, and to maintain fluid pressure on the liquid side of the respective pistons 69 and 70 until such time as the gas pressure is released to ambient atmosphere by actuation of dump valves 170 and/or 182 in response to turning off the system with an on-off switch 190. Switch 190 is connected to an electrical buss 101 by a line 103 containing a circuit breaker 105. The lower dump valve 182 includes a drain line 191 and has the dual purpose of discharging both gas and any liquid (such as condensed water) accumulating in gas chamber 166. A pressure relief valve (not shown) may communicate with the gas chamber side of the accumulator to provide an upper limit to the resistance and return forces that may be generated by contact between the respective pistons and the inner guide 76 therebetween.

The air pressure in the accumulator 150 is automatically recharged each time the system is turned on, thereby eliminating a recharge maintenance function. The gas chamber 166 of pressure accumulator 150 is protected from moisture by the suitable air filters and/or dryers 173 and 192. On systems supplied by an air compressor, the discharge from the upper accumulator dump valve 170 may be routed to a compressor inlet filter (not shown) for providing a backflush function to keep this compressor filter clean.

As it is best to deactivate the centering assembly 18 in the event of a failure of the power steering system, a switch 152 for interrupting electrical power to solenoid valves 170, 182 and 175 may be provided for vehicles with power steering systems. Switch 152 is mounted on a pressure sensor 153 located in a hydraulic line 154 in fluid communication with the outlet of the power steering pump (not shown). A loss of pressure at the pump outlet causes switch 152 to open, thereby causing gas supply valve 175 to close and dump valves 170 and 172 to open for depressurizing gas chamber 166, which in turn depressurizes liquid chamber 204 and centering chambers 61 and 62 connected thereto. Vent lines 191 and 197 are each preferably of larger capacity than gas supply conduit 167 to ensure that gas chamber 166 will be depressurized even if gas supply valve 175 fails to close and either dump valve 170 or 182 fails to open with the opening of pressure switch 152.

Accumulator 150 also allows hydraulic pressure in the centering chambers 61 and 62 to be precisely varied over a relatively wide range because the gas trapped in gas chamber 166 provides a spring-like return force and this chamber may be sized such that the return force does not vary significantly with compressive piston movement. The gas pressure control may comprise a manual throttle valve (not shown) between conduits 171 and 167, in combination with the pressure gauge 176 to indicate accumulator pressure. Alternately, the pressure regulator 181 may be used for maintaining a manually selected system pressure. The control knob 180 is provided to permit varying the pressure settings of the regulator by hand. By varying the gas pressure in gas chamber 166 through adjusting pressure regulator 181, the break away resistance and the centering return force produced by the compensator of the invention can be increased or decreased as desired. The range of pressures available should be selected so that break away resistance can be varied from relatively low at low speeds to relatively high at high speeds.

After linear movement of the inner guide 76 is initiated upon breakaway from the selected center position, the steering force required to sustain movement is a function of the pressure in the accumulator 150, as well as of other centering phenomena acting on the steering system, such as positive wheel caster. Also after break away, accumulator pressure acting on the off-center piston provides a return force that is effective over the entire range of turning angles, which for highway vehicles is usually limited to about 45° on either side of the center position (the 0° position) of the steerable front wheels.

As an alternative to manual adjustment, the output pressure of regulator 181 may be adjusted by a reversible electric motor (not shown) controlled by an on-board computer 160, which comprises a microprocessor 161, an encoder 162 and a decoder 163. Encoder 162 converts to digital signals an analog signal 164 input from a pressure sensor 165 in the gas supply conduit 167, an analog signal 168 input from a vehicle speed sensor 169, and an analog signal 172 input from a position sensor (not shown) within regulator 181. Decoder 163 converts digital control signals generated by microprocessor 161 to an analog signal 174 for controlling the reversible electric motor which adjusts the output pressure provided by regulator 181. The gas pressure in gas chamber 166 and the resulting resistance and centering forces are thereby made automatically responsive to the speed of the vehicle to provide "speed sensitive centering" of the vehicle's steering system. It is preferable that the resistance to turning movements away from the center position be increased automatically as the speed of the vehicle increases because the effects of small off-center movements in response to spurious steering inputs increase dramatically with vehicle speed.

As an alternative to supplying the pressurized liquid directly from the accumulator inlet/outlet fitting 184 to the centering assembly 18 via a direct two-way flow line 26', an alternate centering fluid system 240 may be used to provide additional power centering features. Thus, an additional level of resistance to be overcome before turning movement may be initiated is provided by a pressure differential valve 242 in a return conduit 244 also containing an orifice 254. Although accumulator pressure alone will resist off-center movement of the pistons in the absence of a pressure differential valve, this valve may be used so that the steering force required to make a turning movement away from center is substantially higher than the return force for returning the system to center upon removal of the steering force. Until pressure in one of the centering chambers 61, 62 exceeds the setting of valve 242, movement of both pistons is prevented by fluid trapped in the centering chambers by this valve and check valve 248 in a one-way supply conduit 250. A solenoid operated dump valve 246, which may be actuated by switch 152, will release any residual centering chamber pressure through a drain line 247 in the event of a failure in the power steering system.

When the pressure setting of differential pressure valve 242 is reached, fluid then flows through conduit 244 and a conduit 252 into accumulator liquid chamber 204. Valve 242 is preferably of the spring biased type and dotted line 258 represents a pilot line through which centering chamber pressure is applied until it overcomes the force of a diaphragm spring 260 and opens the valve. The pressure setting of this valve can be varied by adjusting the spring tension, and the valve may include a remotely controlled solenoid 262 so that the pressure differential can be manually or automatically varied in accordance with vehicle speed.

The orifice 254 may be used to control the rate of fluid flow out of the respective centering chambers when valve 242 is open. Orifice 254 may be fixed or variable in size and in either case provides a flow resistance that varies in response to the rate of piston movement. If orifice 254 is of variable size, it may be operated by a remotely controlled solenoid 256 to make its flow restriction controllably variable in response to vehicle speed or to a manual selector. Orifice 254 may comprise a solenoid operated throttle valve or a multiported valve with different size outlet orifices. Both the orifice solenoid 256 and the valve solenoid 262 may be controlled automatically by the on-board computer 160 through the use of inputs and outputs similar to those already described for automatically controlling pressure regulator 181.

The pressurized hydraulic fluid available from the accumulator 150 is transmitted to the centering chambers 61 and 62 through the inlet/outlet conduit 252 and supply conduits 250 and 253. This accumulator energy provides the return force for reseating pistons 69 and 70 in their retracted positions upon removal of intentional steering inputs. Should the rate of piston return to center be too rapid and cause the steering system to overshoot its center position, an orifice 264 may also be installed in supply conduit 250 to control the rate of fluid flow into the respective centering chambers. However, such flow restrictions should not prevent a relatively free return of all components to center.

Although alternative fluid system 240 is optional, the differential pressure valve 242 is an important feature because it may provide improved centering stability and steering control. The steering force may vary within the range of resistance represented by valve 242 without generating any steering movement. This valve then opens at its set point and remains open as long as a pressure differential above the set point exists between pilot line 258 and conduit 252. It will therefore remain open while a centering piston is moving away from center and will close when such movement stops because continued flow through orifice 254 will lower the pressure differential below the set point.

Thereafter, when the steering force drops below the opposing return force generated by accumulator pressure through supply conduit 250, the off-center piston returns to its retracted position as fluid flows from the accumulator through check valve 248. Differential pressure valve 242 in combination with accumulator 150 therefore provides a static resistance force greater than the dynamic resistance force provided by the accumulator alone. The term "static" is used in this specification to distinguish the variable resistance force provided by orifice 254 in response to the rate of fluid flow produced by movement of a centering piston. By comparison, the resistances provided by accumulator 150 and valve 242 are both present without fluid flow.

The variable resistance and return force components of the invention can be used alone as a centering unit without the remote trimming features. On the other hand, the remote trimming features of the invention are useable not only with the centering unit disclosed herein, but also in combination with centering mechanisms of the prior art. In addition, a number of other modifications to both the centering assembly components and the trim assembly components specifically described herein are possible without departing from the scope of the invention, as defined by the claims below.

What is claimed is:

1. An apparatus for positioning at least one steerable member mounted on a frame for movement to either side of a selected position, said apparatus comprising:

a screw member having a spiral thread and fixed between an input shaft connected to a steering member and an output shaft connected to said steerable member, said screw member being rotatable with said input and output shafts and the rotational position of said screw member defining said selected position;

centering cylinder means for providing first and second centering chambers;

a first piston arranged for reciprocating movement in said first centering chamber, and a second piston arranged for reciprocating movement in said second centering chamber, each of said first and second pistons being arranged to move independently of the other between a retracted position and a compressive position for compressing a resilient means within its corresponding chamber, said resilient means when compressed applying a resilient force opposing compressive movement of the corresponding piston; and, thread engaging means for transmitting said resilient force from said first and second pistons to said screw member, said thread engaging means comprising a reciprocating member arranged for movement to either side of a neutral position corresponding to said selected position, and a screw follower member for causing said reciprocating member to engage each of said pistons independently of the other, said follower member engaging said screw threads so that rotation of said screw member in one direction causes said reciprocating m ember to move to one side of said neutral position and produce compressive movement of said first piston without moving said second piston and rotation of said screw member in the other direction causes said reciprocating member to move to the other side of said neutral position and produce compressive movement of said second piston without moving said first piston;

said transmission of said resilient force to said screw member causing said screw to provide a resistance force resisting steering forces tending to move said steerable member to either side of said selected position.

2. An apparatus according to claim 1, wherein said centering cylinder means comprises a centering cylinder, wherein said screw member is positioned in said centering cylinder between said first and second pistons, and wherein said screw member is mounted for rotation relative to said centering cylinder.

3. An apparatus according to claim 2, wherein at least one of said reciprocating member and said centering cylinder has a spline extending in a direction parallel to the axis of said centering cylinder, and wherein the other of said reciprocating member and said centering cylinder has a groove cooperating with said spline to guide axial reciprocation of said reciprocating member, said follower member being fixed to said reciprocating member so that rotation of said follower member is prevented by said spline and groove cooperation when said screw member rotates relative to said centering cylinder.

4. An apparatus according to claim 3, wherein said centering cylinder is connected to a frame means by a connection means comprising a resilient member permitting said centering cylinder to rotate with said screw member through a limited angle, the value of which corresponds to an amount that the resilient member may be deformed by a steering force applied to said input shaft.

5. An apparatus according to claim 1 for use on a vehicle having a steering system comprising said at least one steerable member, said apparatus further comprising trim means for varying the selected position of said steerable member by changing the neutral position of said reciprocating member relative to a corresponding neutral position of said screw member, said trim means comprising drive means for causing trimming movement of said reciprocating member in response to at least one remote input so as to rotate said reciprocating member relative to said screw member, and control means for selectively providing said at least one remote input to said drive means from a location remote to said reciprocating member such as a driver's station of said vehicle.

6. An apparatus according to claim 5, wherein said trimming means further comprises means for mounting a centering cylinder of said centering cylinder means for rotation about said input and output shafts and connecting means for connecting said drive means to said centering cylinder for causing said centering cylinder to rotate in either direction around said input and output shafts, wherein said drive means comprises reversible motor means and a trimming rod is connected to said connecting means and selectively movable in an extension direction and a retraction direction by said motor means, wherein said control means comprises switch means connected to said motor means so that actuation of said switch means causes said motor means to selectively move said trimming rod, and wherein said trimming rod is connected to said cylinder connecting means so that movement of said trimming rod causes said centering cylinder to rotate and thereby alter the neutral position of said reciprocating member relative to the neutral position of said screw member.

7. An apparatus according to claim 1, wherein said resilient means comprises pneumatic means for providing a pressurized gas in said first and second centering chambers.

8. An apparatus according to claim 1, wherein said resilient means comprises vacuum means for providing a vacuum in said first and second centering chambers.

9. An apparatus according claim 1, wherein said resilient means comprises spring means for providing a spring force opposing movement of said first and second pistons respectively in said first and second centering chambers.

10. An apparatus according to claim 1, wherein said resilient means comprises hydraulic means for providing a pressurized liquid in said first and second centering chambers.

11. An apparatus according to claim 1 further comprising control means for changing the amount of said resilient force by varying from a location remote from said centering cylinder means an amount by which said resilient means presses against said first and second pistons.

12. An apparatus according to claim 11, wherein said control means comprises means for manually adjusting the amount by which said resilient means presses against said first and second pistons.

13. An apparatus according to claim 11, wherein said control means comprises means responsive to a sensed condition for automatically adjusting the amount by which said resilient means presses against said first and second pistons.

14. An apparatus according to claim 11 for use on a vehicle having a steering system comprising said at least one steerable member, wherein said control means comprises means responsive to a speed of said vehicle for automatically adjusting the amount by which said resilient means presses against said first and second pistons.

15. An apparatus according to claim 1, wherein said resilient means comprises fluid means for providing a pressurized fluid in each of said first and second centering chambers so that fluid pressure provides said resistance force by opposing movement of said steerable member toward either side of said selected position and provides a return force continuously biasing said steerable member toward said selected position during movement of said steerable member to either side of said selected position, said fluid pressure causing said pistons to bias said reciprocating member toward said neutral position during a compressive movement of each of said pistons in its corresponding centering chamber.

16. An apparatus according to claim 15, wherein said fluid means includes means for controllably varying said fluid pressure so as to vary at least one of said resistance force and said return force.

17. An apparatus according to claim 15, wherein said fluid is a liquid and said liquid flows to and from said centering chambers via centering conduit means, and wherein said centering conduit means comprises a pressure actuated valve means for preventing fluid flow from said centering chambers until engagement between said reciprocating member and one of said first and second pistons produces a fluid pressure differential above a pressure provided by a pressurizing means.

18. An apparatus according to claim 17, wherein said pressure actuated valve means includes means for controllably varying the amount of said fluid pressure differential.

19. An apparatus according to claim 15 for use on a vehicle having a steering system comprising said at least one steerable member, wherein said fluid means comprises pressurizing means for providing a pressurized liquid in said first and second centering chambers, wherein said pressurizing means comprises gas pressure means for applying pressure of a pressurized gas to said liquid in a liquid reservoir and control means for automatically adjusting the amount of said gas pressure in response to the speed of said vehicle.

20. An apparatus according to claim 15 for a vehicle having a power steering unit for providing steering power to said steerable member, wherein said fluid means comprises means for preventing said fluid pressure in the absence of steering power from said power steering unit.

* * * * *